United States Patent [19]
Pfaendner et al.

[11] Patent Number: 5,859,102
[45] Date of Patent: Jan. 12, 1999

[54] PROCESS FOR THE STABILIZATION OF AND STABILIZER MIXTURES FOR PVDC-CONTAINING POLYOLEFIN MIXTURES

[75] Inventors: Rudolf Pfaendner, Rimbach/Odenwald; Heinz Herbst, Lautertal-Reichenbach; Kurt Hoffmann, Lauteral, all of Germany

[73] Assignee: Ciba Speciality Chemicals Corporation, Tarrytown, N.Y.

[21] Appl. No.: 663,315

[22] PCT Filed: Dec. 9, 1994

[86] PCT No.: PCT/EP94/04105

§ 371 Date: Jun. 20, 1996

§ 102(e) Date: Jun. 20, 1996

[87] PCT Pub. No.: WO95/17465

PCT Pub. Date: Jun. 29, 1995

[30] Foreign Application Priority Data

Dec. 22, 1993 [CH] Switzerland .............................. 3818/93

[51] Int. Cl.⁶ .............................. C08K 5/49; C08K 5/53; C08K 15/32
[52] U.S. Cl. .......................... 524/117; 524/118; 524/119; 524/120; 524/126; 524/153; 523/46; 252/400.21; 252/400.24; 252/400.52; 252/400.61
[58] Field of Search ......................... 252/400.21, 400.24, 252/400.52, 400.61; 524/117, 118, 119, 120, 126, 153; 523/46

[56] References Cited

U.S. PATENT DOCUMENTS

| 3,501,430 | 3/1970 | Weisfeld ................................... 260/23 |
| 4,346,025 | 8/1982 | Leistner et al. .......................... 524/141 |
| 4,348,308 | 9/1982 | Minagawa et al. ...................... 524/110 |
| 5,075,355 | 12/1991 | Hall et al. ................................ 523/351 |
| 5,286,424 | 2/1994 | Su et al. .................................... 264/23 |
| 5,292,364 | 3/1994 | Haraiwa et al. ..................... 106/287.1 |

FOREIGN PATENT DOCUMENTS

| 0510800 | 10/1992 | European Pat. Off. . |
| 0604136 | 6/1994 | European Pat. Off. . |
| 1481281 | 7/1977 | United Kingdom . |
| 2252325 | 5/1992 | United Kingdom . |

OTHER PUBLICATIONS

2 Encyclopedia Poly Sci. & Eng. Antioxidants, 73 (J. Wiley & Sons) 1985.
Chemical Abstract 109:23865u of JP 6,364,465.
Chemical Abstract 118:23219x of DE 4,202,276.
Chemical Abstract 121:302272m of EP–A–604,136.
Chemical Abstract 122:189344s of JP 06,263,930.
Chemical Abstract 122:107591h of JP 06,184,365.
Chemical Abstract 122:163369d of EP–A–618,315.
Chemical Abstract 122:189350r of JP 06,240,054.
Chem. Abstr. 122:189350r of JP 06,240,054.
Chem. Abstr. 122:163369d of EP 618,315.
Chem. Abstr. 122:189344s of JP 06,263,930.
Chem. Abstr. 118:23219x of DE 4,202,276.
Chem. Abstr. 121:302272m of EP 604,136.
Chem. Abstr. 122:107591h of JP 06,184,365.
Chem. Abstr. 109:23856s of EP 260,843.

*Primary Examiner*—Kriellion S. Morgan
*Attorney, Agent, or Firm*—David R. Crichton; Luther A. R. Hall; Victoria M. Malia

[57] ABSTRACT

Plastic mixtures, in particular recycled plastic mixtures, comprising predominantly polyolefins and 0.05–20% by weight of PVDC can be stabilized against thermo-oxidative degradation by addition of a combination of an organic phosphite or phosphonite and a metal salt of a fatty acid.

19 Claims, No Drawings

PROCESS FOR THE STABILIZATION OF AND STABILIZER MIXTURES FOR PVDC-CONTAINING POLYOLEFIN MIXTURES

The invention relates to a process for the stabilization of PVDC-containing polyolefin mixtures, in particular recyclates, and to the stabilizer mixtures which can be used for this purpose.

Copolymers based on vinylidene chloride (PVDC), for example with vinyl chloride, acrylonitrile, acrylates or ethylene as comonomers, are used as coating materials and films as a barrier layer in the packaging of foods, pharmaceuticals and other products in order to achieve impermeability, for example to water and oxygen, fats, gases and flavours. Further information on PVDC is given in H. Domininghaus "Die Kunststoffe und ihre Eigenschaften", VDI-Verlag, Düsseldorf, 4th Edn., 1992, pages 219ff.

The recycling of such materials, which are generally in the form of laminates (multilayer films), usually in combination with polyolefins, such as LDPE (high-pressure polyethylene), HDPE and PP (polypropylene), and their conversion into new products, for example by extrusion and injection moulding, causes problems, even at very low PVDC concentrations, due to decomposition and discoloration and thus unsatisfactory mechanical properties. A corresponding situation applies to the processing of film mixtures from collected valuable materials, which can contain PVDC, for example as a coating on a film, which in general cannot be separated out by physical methods.

U.S. Pat. No. 5,075,355 describes a process for the stabilization of recycled PVDC-containing films. In addition to the use of a supported polymer and a pyrophosphate, the process requires a metal hydroxide complex of the hydrotalcite type.

Other ways of stabilizing PVDC-containing polymers are described in EP-A 0 510 800, U.S. Pat. No. 5,286,424 and EP-A 0 604 136.

Thus, there continues to be a demand, and this is the object of the present invention, for the provision of a process which enables the processing of PVDC-containing plastic mixtures, predominantly comprising polyolefins, without significant discoloration and/or with retention of the mechanical properties in an economical and technically feasible manner.

It has now been found that PVDC-containing plastic mixtures, in particular recyclates, can be stabilized in a simple and economical manner against thermo-oxidative degradation during processing and subsequent use by a mixture of an organic phosphite or phosphonite and a metal salt of a fatty acid.

The invention relates to a process for the stabilization of a plastic mixture predominantly comprising polyolefins and 0.05–20% by weight PVDC, which comprises adding (a) at least one organic phosphite or phosphonite and (b) at least one metal salt of a fatty acid to this mixture.

The plastic mixtures to be stabilized are, for example, film offcuts generated in the production of multilayer films, films coated with an aqueous PVDC dispersion or film mixtures from collected valuable materials. However, fresh plastic mixtures can also be employed in the process.

These plastic mixtures comprise predominantly polyolefins. Preferred plastic mixtures comprise 80–99.95% by weight, in particular 95–99.9% by weight, of polyolefins and 0.05–20% by weight, in particular 0.1–5% by weight, of PVDC, it also being possible for the polyolefins to be in the form of mixtures. Small amounts of polymers such as polystyrene, PET, PVC or polyamide can also be present.

Furthermore, the term polyolefins also includes copolymers such as EVA. It may furthermore be expedient, in particular in the case of polyolefin mixtures, to add compatibility improvers (compatibilizers).

In particular, the invention relates to the stabilization of recycled plastic mixtures of said composition. Recycled plastic mixtures may also contain small amounts of foreign materials, for example paper, pigments and adhesives, which are frequently difficult to remove. These foreign materials can also originate from contact with diverse substances during use or treatment, for example fuel residues, paint residues, traces of metal, initiator residues or traces of water.

In the plastic mixtures, the dominant polyolefins are usually polyethylene (PE) and polypropylene (PP), in particular low-density polyethylene (LDPE), linear low-density polyethylene (LLDPE) and high-density polyethylene (HDPE), furthermore copolymers such as ethylene-propylene (EPM) and ethylene-propylene-diene (EPDM) copolymers, and ULDPE and MDPE. Particular preference is given to the stabilization of PVDC-containing polyolefin recyclates containing polypropylene, HD polyethylene or LD polyethylene.

The novel process preferably uses from 0.05 to 10% by weight, particularly preferably from 0.05 to 5% by weight, very particularly preferably from 0.1 to 2% by weight, based on the plastic mixture, of the mixture of (a) and (b).

Furthermore, the novel process preferably uses from 0.01 to 2% by weight of (a) and from 0.05 to 5% by weight of (b), particularly preferably from 0.02 to 0.1% by weight of (a) and from 0.1 to 2% by weight of (b), in each case based on the plastic mixture.

The organic phosphites or phosphonites which can be used as component (a) are known as stabilizers for plastics, in particular as processing stabilizers for polyolefins.

They are predominantly aromatic phosphites and phosphonites, for example triphenyl phosphite, diphenyl alkyl phosphites, phenyl dialkyl phosphites, tris(diphenyl alkyl phosphite)amines, tris(nonylphenyl) phosphite, trilauryl phosphite, trioctadecyl phosphite, distearyl pentaerythrityl diphosphite, tris(2,4-di-tert-butylphenyl) phosphite, distearyl pentaerythrityl diphosphite, bis(2,4-di-tert-butylphenyl) pentaerythityl diphosphite, tristearyl sorbityl triphosphite, tetrakis(2,4-di-tert-butylphenyl)-4,4'-biphenylene diphosphonite, 3,9-bis(2,4-di-tert-butyl-4-methylphenoxy)-2,4,8,10-tetraoxa-3,9-diphosphaspiro[5.5]undecane, 3,9-tris(2,4,6-tris-tert-butylphenoxy)-2,4,8,10-tetraoxa-3,9-diphosphaspiro[5,5]undecane, 2,2'-ethylidenebis(4,6-di-tert-butylphenyl) fluorophosphite and phosphites of the formula

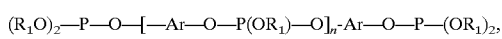

wherein

R$_1$ is C$_1$–C$_{18}$alkyl, C$_6$–C$_{15}$aryl, C$_5$–C$_6$cycloalkyl, C$_7$–C$_9$aralkyl, or a C$_1$–C$_{18}$monoalcoholresidue containing at least one oxetane group, under the condition that at least one of R$_1$ is such a C$_1$–C$_{18}$monoalcoholresidue containing at least one oxetane group; and Ar is a radical

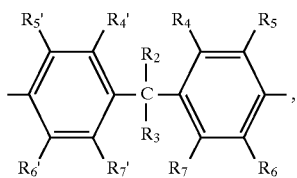

wherein

R₂ and R₃, independently of one another, are H, $C_1$–$C_{18}$alkyl or $C_6$–$C_{18}$-aryl; and R₄, R₄', R₅, R₅', R₆, R₆', R₇, and R₇', independently of one another, are H, $C_1$–$C_{18}$alkyl, $C_5$–$C_6$cycloalkyl, $C_6$–$C_{18}$aryl, $C_1$–$C_{18}$alkoxy, $C_1$–$C_{18}$aryloxy or halogen;

as well as phosphorous acid esters of the formula

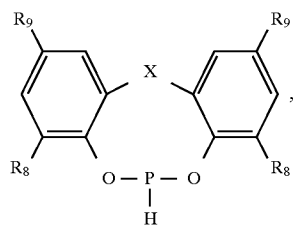

wherein

R₈ and R₉, independently of one another, are $C_1$–$C_9$alkyl, $C_5$–$C_6$cycloalkyl, $C_7$–$C_9$aralkyl or $C_6$–$C_{19}$aryl; and X is —S— or —CH—R₁₀, in which R₁₀ is H, $C_1$–$C_6$alkyl or $C_5$–$C_6$cycloalkyl.

Particular preference is given to the following phosphites and phosphonites:

tris(2,4-di-tert-butylphenyl) phosphite;

tetrakis(2,4-di-tert-butyl)-4,4'-biphenylene diphosphonite;

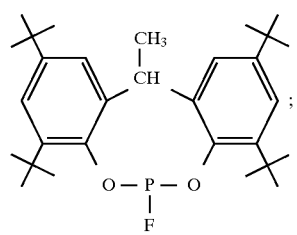

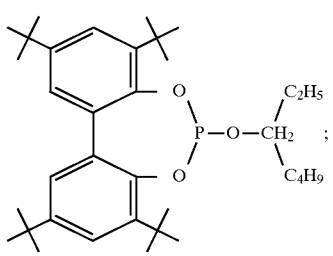

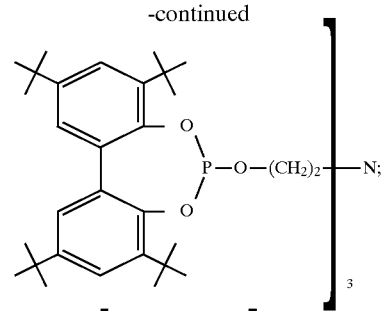

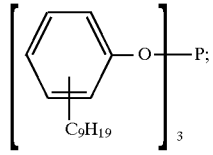

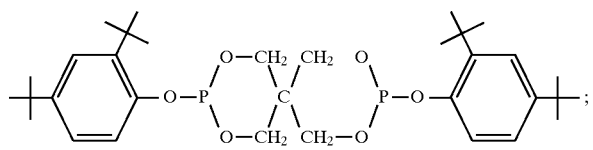

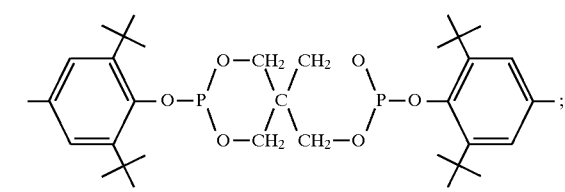

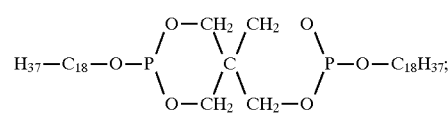

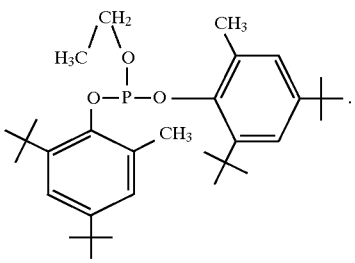

Component (a) is very particularly preferably tris(2,4-di-tert-butylphenyl) phosphite.

Component (b) is a metal salt of a fatty acid, where the metal may be, in particular, an element of main or sub-group II or aluminium or tin.

These are, in particular, tin or preferably calcium, zinc, magnesium or aluminium salts from the series consisting of aliphatic saturated $C_2$–$C_{22}$carboxylates, aliphatic olefinic $C_3$–$C_{22}$carboxylates, aliphatic $C_2$–$C_{22}$carboxylates which are substituted by at least one OH group, cyclic or bicyclic $C_5$–$C_{22}$carboxylates, aromatic $C_7$–$C_{22}$carboxylates, aromatic $C_7$–$C_{22}$carboxylates which are substituted by at least one OH group, $C_1$–$C_{16}$alkyl-substituted phenylcarboxylates and phenyl $C_1$–$C_{16}$alkylcarboxylates, preference being given to behenates, in particular stearates, laurates and oleates.

Component (b) is very particularly preferably calcium stearate, zinc stearate, magnesium stearate or aluminium stearate.

It is also possible to use a mixture of various components (a) and (b). For example, component (b) may be a mixture of calcium laurate and calcium stearate or of zinc stearate and calcium stearate, calcium stearate and zinc oleate or calcium stearate and zinc laurate.

The addition of the stabilizer mixtures to the plastic mixture allows thermoplastic processing with reduced degradation and/or extends the service life or preserves the mechanical properties of the materials produced from the recyclate.

It is also possible to use further conventional plastic additives which improve the processing or the material properties of the plastic mixture, for example polyols and/or compatibilizers.

Examples of suitable polyols are: pentaerythritol, dipentaerythritol, tripentaerytoritol, bistrimethylolpropane, bistrimethylolethane, trismethylolpropane, sorbitol, maltitol, isomaltitol, lactitol, isomaltitol, lycasine, mannitol, lactose, leucrose, tris(hydroxyethyl) isocyanurate, palatinitol, tetramethylolcyclohexanol, tetramethylolcyclopentanol, tetramethylolcyclopyranol, glyercol, diglycerol, polyglycerol and 1-0-α-D-glycopyranosyl-D-mannitol dihydrate.

The polyols can be used in an amount of, for example, from 0.01 to 20 parts by weight, expediently from 0.1 to 20 parts by weight, in particular from 0.1 to 10 parts by weight, based on 100 parts by weight of PVDC-containing plastic mixture.

The compatibilizers can be, for example, copolymers, in particular block copolymers, of styrene with butadiene and, if desired, acrylonitrile. They can be copolymers of ethylene and propylene, and may contain a third monomer component, for example butadiene. Chlorinated polyethylene or ethylene-vinyl acetate copolymers are also suitable as compatibilizers. Further suitable compatibilizers contain, in particular, polar groups, e.g. maleic anhydride-styrene copolymers or graft polymers containing acrylic acid groups.

The polymeric compatibilizers are generally used in amounts of 1–20% by weight, based on the plastic mixture to be stabilized.

The stabilizing action of the mixture of (a) and (b), in particular the long-term stability, may be synergistically increased by the addition of so-called thiosynergists. These are aliphatic thioethers, in particular esters of thiodipropionic acid. Examples are the lauryl, stearyl, myristyl and tridecyl esters of thiodipropionic acid or distearyl disulfide. These thiosynergists are preferably used in an amount of from 0.1 to 1% by weight, based on the plastic mixture.

Further suitable stabilizers from the series consisting of the lactates, e.g. calcium lactate and calcium stearyl-2-lactate, or lactones, e.g.

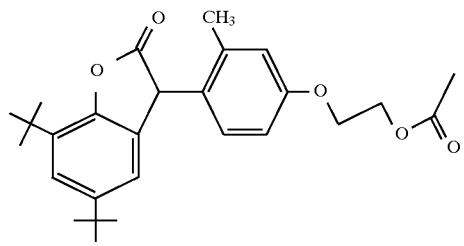

may likewise additionally be added.

If high light stability is also required of the article produced from the plastic mixture, the addition of one or more light stabilizers is advisable. Suitable light stabilizers are, in particular, those from the series consisting of the benzophenones, benzotriazoles, oxanilides and sterically hindered amines. Examples of such compounds are:

2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octoxy, 3',5'-di-tert-amyl and 3',5'-bis(α,α-dimethylbenzyl) derivatives.

Oxalamides, for example 4,4'-dioctyloxyoxanilide, 2,2'-dioctyloxy-5,5'-di-tert-butyloxanilide, 2,2'-didodecyloxy-5, 5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstituted oxanilides.

Sterically hindered amines, for example bis(2,2,6,6-tetramethylpiperidyl) sebacate, bis(1,2,2,6,6-pentamethylpiperidyl) sebacate, bis(1-octyloxy-2,2,6,6-tetramethyl-4-piperidyl) sebacate, bis(1,2,2,6,6-pentamethylpiperidyl) n-butyl-3,5-di-tert-butyl-4-hydroxybenzylmalonate, the product of the condensation of 1-hydroxyethyl-2,2,6,6-tetramethyl-4-hydroxypiperidine and succinic acid, the product of the condensation of N,N'-bis(2,2,6,6-tetramethyl-4-piperidyl)hexamethylenediamine and 4-tert-octylamino-2,6-dichloro-1,3,5-s-triazine or 4-morpholino-2,6-dichloro-1,3,5-triazine, tetrakis(2,2,6,6-tetramethyl-4-piperidyl) 1,2,3,4-butanetetraoate, bis(2,2,6, 6-tetramethylpiperidyl) succinate, N-(1,2,2,6,6-pentamethyl-4-piperidyl)-α-dodecylsuccinimide, N-(2,2,6, 6-tetramethyl-4-piperidyl)-α-dodecylsuccinimide, 2,4,6-tris [N-pentyl-2-(3,3,5,5-tetramethyl-2-oxo-piperazino) ethylamino]-1,3,5-triazine, 2,2,4,4-tetramethyl-7-oxa-3,20-diaza-21-oxo-di-spiro[5,1,11,2]heneicosane, 2,2,4,4-tetramethyl-20-(2-dodecyloxycarbonylethyl)-7-oxa-3,20-diaza-21-oxo-dispiro[5,1,11,2]heneicosane, 8-acetyl-3-dodecyl-1,3,8-triaza-7,7,9,9-tetramethylspiro[4,5]decane-2, 4-dione, 1,5,8,12-tetrakis[2,4-bis(N-butyl-1,2,2,6,6-pentamethyl-4-piperidylamino)-1,3,5-triazin-6-yl]-1,5,8,12-tetraazadodecane, and polysiloxanes containing 2,2,6,6-tetramethyl-4-piperidinyl groups.

The light stabilizers are preferably added in an amount of from 0.01 to 2% by weight, in particular from 0.05 to 0.5% by weight, based on the plastic mixture. The light stabilizer used is preferably a combination of a benzotriazole with a sterically hindered amine.

The addition of antioxidants, in particular phenolic antioxidants, does not prevent any damage during processing of the plastic mixture. If low demands are made of the colour stability and in particular long-term applications, the addition of a phenolic antioxidant may be advantageous.

Phenolic antioxidants which may be mentioned are:

1.1 Alkylated monophenols, for example 2,6-di-tert-butyl-4-methylphenol, 2-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4methylphenol, 2,4-dimethyl-6-(1'-methyl-undec-1'-yl)-phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Chroman derivatives of the formula

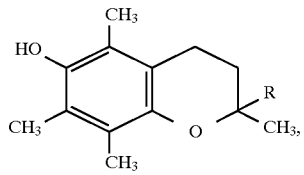

where R is —(CH$_2$)$_3$—CH(CH$_3$)—(CH$_2$)$_3$—CH(CH$_3$)—(CH$_2$)$_3$—CH—(CH$_3$)$_2$ or —CH$_2$—CH$_2$—O—C(O)-Z, and Z is C$_1$–C$_{18}$alkyl, —CH$_2$—CH$_2$—S—C$_1$–C$_{18}$alkyl or

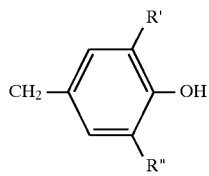

and R' and R" are hydrogen, methyl or tert-butyl, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidene bisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylene-bis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris-(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl 3,5-di-tert-butyl-4-hydroxybenzylmercaptoacetate.

1.8. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di-[4-(1,1,3,3-tetramethylbutyl)phenyl] 2,2-bis(3,5-di-tert-butyl-4-hydroxybenzyl) malonate.

1.9. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris-(3,5-di-tert-butyl-4-hydroxybenzyl)phenol.

1.10. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethyl-benzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

1.11. Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxy-benzylphosphonate, dioctadecyl 5-tert-butyl-4-hydroxy-3-methylbenzylphosphonate, calcium salt of monoethyl 3,5-di-tert-butyl-4-hydroxybenzyl phosphonate.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]octane.

1.14. Esters of β-(5-tert-butyl-4-hydroxy-3-methylphenyl)propionic acid, with monohydric or polyhydric alcohols, for example methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]octane.

1.15. Esters of β-(3,5-dicyclohexyl-4-hydroxyphenyl) propionic acid, with monohydric or polyhydric alcohols, for example methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.16. Esters of 3,5-di-tert-butyl-4-hydroxyphenylacetic acid, with monohydric or polyhydric alcohols, for example methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.17. Amides of β-(3,5-di-tert-butyl-4-hydroxyphenyl) propionic acid, for example N,N'-bis(3,5-di-tert-butyl-4hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

Preference is given to antioxidants such as:

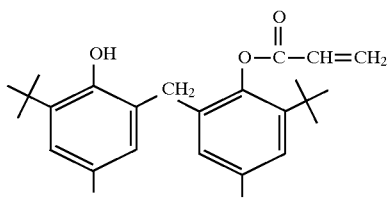

{2-(1,1-dimethylethyl)-6-[[3-(1,1-dimethylethyl)-2-hydroxy-5-methylphenyl]methyl]-4-methylphenyl 2-propenoate};

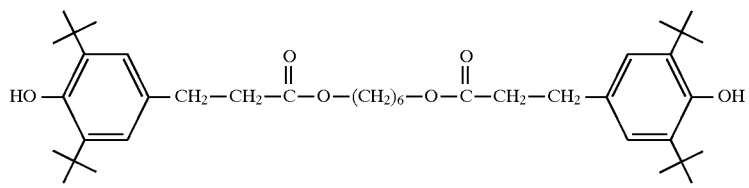

{1,6-hexanediyl 3,5-bis(1,1-dimethylethyl)-4-hydroxyphenylpropanoate};

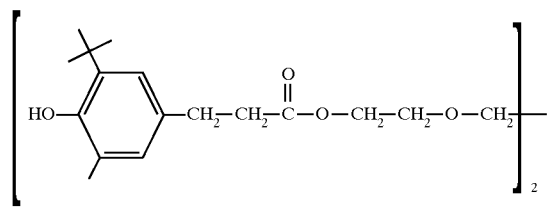

{1,2-ethanediylbis(oxy-2,1-ethanediyl) 3-(1,1-dimethylethyl)-4hydroxy-5-methyl-phenylpropanoate};

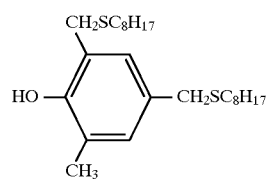

{2-methyl-4,6-di[(octylthio)methyl]phenol};

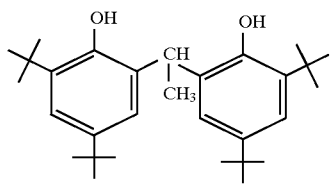

{2,2'-ethylidenebis(4,6-di-tert-butylphenol)};

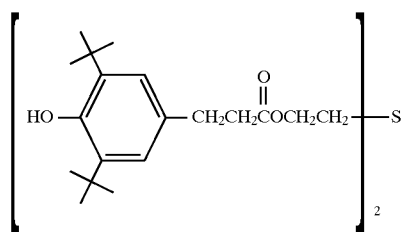

{thiodi-2,1-ethanediyl bis-3,5-di(1,1-dimethylethyl)-4-hydroxyphenylpropanoate};

{1,3-propanediylbis(3,5-di(1,1-dimethylethyl)-4-hydroxyphenylpropanamide)};

{di-1,3-propanediylbis(3,5-di(1,1-dimethylethyl)-4-hydroxyphenylpropanamide)};

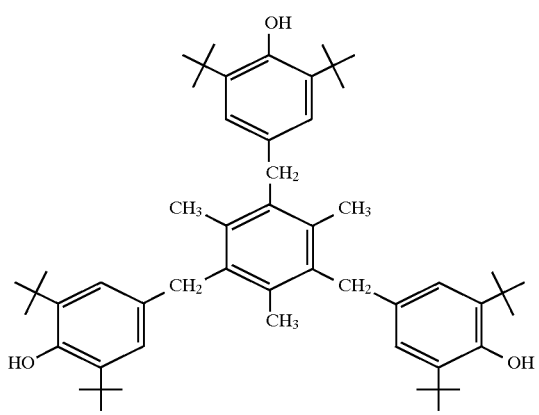

{4,4',4''-[(2,4,6-trimethyl-1,3,5-phenyltriyl)tris(methylene)]tris[2,6-bis(1,1-dimethylethyl) phenol};
and the pentaerythrityl, octyl and octadecyl esters of β-(3,5-di-tert-butyl-4-hydroxyphenyl)propionic acid.

The present invention furthermore relates to a stabilizer mixture comprising (a) at least one organic phosphite or phosphonite and (b) at least one metal salt of a fatty acid, and to the use thereof for the stabilization of a plastic mixture, in particular a recycled plastic mixture, comprising predominantly polyolefins and 0.05–20% by weight of PVDC.

The present invention furthermore relates to a plastic mixture, in particular a recycled plastic mixture, comprising predominantly polyolefins and 0.05–20% by weight of PVDC which furthermore comprises (a) at least one organic phosphite or phosphonite and (b) at least one metal salt of a fatty acid.

Preferred (recycled) plastic mixtures, preferred stabilizer mixtures and their use conform in their components and mixing ratios to the preferences mentioned in greater detail under the process.

Specific and preferred stabilizer mixtures are those comprising 2–30% by weight of aromatic phosphite, 10–70% by weight of metal salt of a fatty acid and 5–60% by weight of polyol, and very particularly those comprising 2–30% of tris(2,4-di-tert-butylphenyl) phosphite, 5–35% of calcium stearate or laurate, 5–35% of zinc stearate or laurate and 5–60% of pentaerythritol.

The novel stabilizer mixtures and, if desired, the additives mentioned can be employed in compacted, extruded form or on a support material, or can be added directly to the plastic mixture as individual substances, a mixture or in the form of powders. They are distinguished by very good dispersibility.

The incorporation of the stabilizers in the plastic mixture is effected by the known and usual methods.

If required, further conventional plastic additives, for example fillers, such as sawdust or mica, reinforcing materials, such as glass fibres, glass beads or mineral fibres, pigments, plasticizers, lubricants, flameproofing agents, antistatics or blowing agents, can be added to the (recycled) plastic mixtures. Such additives depend on the intended use.

The (recycled) plastic mixtures stabilized in this way can be used for a wide variety of purposes, for example again for films, tubes, sheets, profiles, construction parts or containers.

In the case of recyclates, these can also be mixed with fresh plastics or employed together with fresh plastics, for example in a coextrusion process.

The examples below illustrate the novel process and stabilizer mixture in greater detail. Here, as in the remainder of the description,

represents a tert-butyl radical, parts are parts by weight and percentages are percent by weight, unless stated otherwise.

EXAMPLES 1+2

A mixture comprising 89 parts of Lupolen 3062F® (LDPE; BASF, DE);

10 parts of Levapren 450® (EVA; Bayer, DE); and 1 part of Ixan PV 880® (PVDC; Deutsche Solvay Werke, DE);

is homogenized in a Brabender mixer ((Brabender Plasticorder PL 2001/3, W50 mixing compartment) at 190° C. with addition of the stabilizers shown in the table below. To this end, first the mixture of LDPE and EVA granules is melted (2 minutes) with addition of the stabilizers, the PVDC is then added, and finally the entire mixture is compounded for 3 minutes.

The mixture is removed from the Brabender mixer and pressed for 2 minutes at 190° C. to give sheets with a thickness of 2 mm.

After this double temperature treatment, the yellowness index (YI) of the sheets is determined in accordance with ASTM D 1925-70. The values given in the table below show that the best stabilization (lowest YI values) is achieved by the novel process.

TABLE 1

| | Additives* | TSC* | YI |
|---|---|---|---|
| Example 1 | 0.225 calcium stearate<br>0.335 zinc stearate<br>0.440 pentaerythritol<br>0.200 P-1 | 1.2 | 22 |
| Example 2 | 0.180 calcium stearate<br>0.268 zinc stearate<br>0.352 pentaerythritol<br>0.200 P-1 | 1.0 | 32 |
| Comparative Example 1 | no additives | — | 80 |
| Comparative Example 2 | 0.225 calcium stearate<br>0.335 zinc stearate<br>0.440 pentaerythritol | 1.0 | 35 |
| Comparative Example 3 | 0.500 P-1 | 0.5 | 82 |

Additives*: parts per 100 parts of polymer mixture
TSC*: total stabilizer concentration in %
"P-1" represents tris(2,4-di-tert-butylphenyl) phosphite

EXAMPLES 3+4

A mixture of 86 parts of LDPE (Lupolen® 3062 F; BASF)

10 parts of EVA (Levapren® 450; Bayer)

4 parts of PVDC (Ixan® PV 880; Solvay)

is compounded at a temperature in the range from 165° to 175° C. at 30 rpm in a Haake TW 100 twin-screw extruder (heating zones: 165°/165°/165°/170°/175° C.).

The product is subsequently re-extruded under the above conditions without additive (Comparative Example 4) or with the stated additives, the granules are pressed to give a sheet, and the yellowness index is determined in accordance with ASTM D 1925-70.

| | | |
|---|---|---|
| Comparative Example 4 | no additive | YI = 67 |
| Example 3 | 0.112% calcium stearate | YI = 48 |
| | 0.168% zinc stearate | |
| | 0.220% pentaerythritol | |
| | 0.100% P-2 | |
| Example 4 | 0.112% calcium stearate | YI = 53 |
| | 0.168% zinc stearate | |
| | 0.220% pentaerythritol | |
| | 0.100% P-2 | |

"P-2" represents tetrakis(2,4-tert-butylphenyl)-4,4'-biphenylene diphosphonite

What is claimed is:

1. A process for the stabilization of a plastic mixture predominantly comprising polyolefins and 0.05–20% by weight of PVDC, which comprises adding (a) at least one organic phosphite or phosphonite and (b) at least one metal salt of a fatty acid to this mixture.

2. A process according to claim 1, wherein the plastic mixture comprises 0.1–5% by weight of PVDC.

3. A process according to claim 1, wherein the plastic mixture is a recyclate.

4. A process according to claim 1, wherein 0.05–10% by weight, based on the plastic mixture, of a mixture of (a) and (b) is used.

5. A process according to claim 1, wherein 0.05–5% by weight, based on the plastic mixture, of a mixture of (a) and (b) is used.

6. A process according to claim 1, wherein 0.01–2% by weight of (a) and 0.05–5% by weight of (b), in each case based on the plastic mixture, are used.

7. A process according to claim 1, wherein component (a) is an aromatic phosphite.

8. A process according to claim 1, wherein component (a) is one of the compounds tris(2,4-di-tert-butylphenyl) phosphite;

tetrakis(2,4-di-tert-butyl)-4,4'-biphenylene diphosphonite;

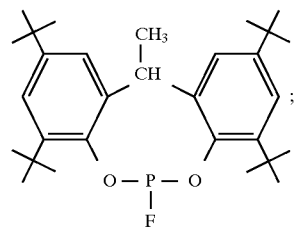

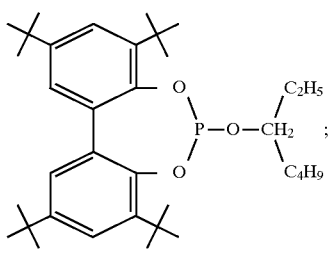

-continued

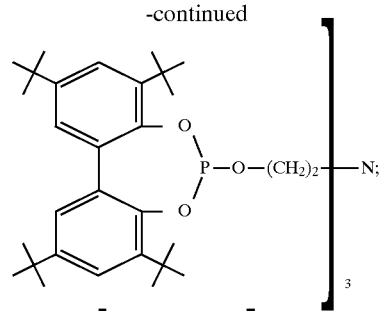

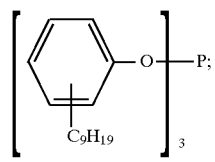

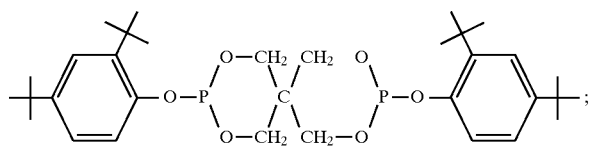

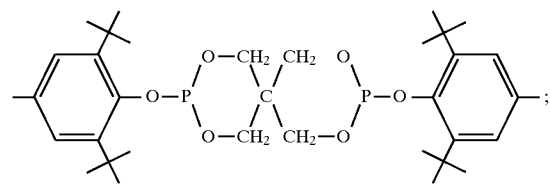

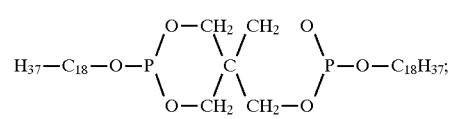

or

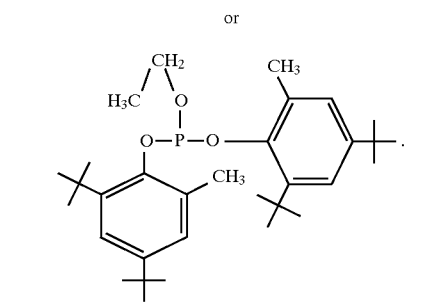

9. A process according to claim 1, wherein component (a) is tris(2,4-di-tert-butylphenyl) phosphite.

10. A process according to claim 1, wherein component (b) is a metal salt of a fatty acid, where the metal is an element from main group or sub-group II, aluminium or tin.

11. A process according to claim 1, wherein component (b) is magnesium stearate, magnesium laurate, tin stearate, tin laurate, zinc stearate, zinc laurate, aluminium stearate, aluminium laurate, calcium stearate or calcium laurate.

12. A process according to claim 1, wherein component (b) is calcium stearate or zinc stearate.

13. A process according to claim 1, wherein component (b) is a mixture of various metal salts of fatty acids, where the metal is an element from main group or sub-group II, aluminium or tin.

14. A process according to claim 1, wherein, in addition to components (a) and (b), a polyol and/or a compatibilizer is used.

15. A stabilizer mixture comprising (a) at least one organic phosphite or phosphonite and (b) at least one metal salt of a fatty acid.

16. A stabilizer mixture according to claim 15, comprising 2–30% of aromatic phosphite, 10–70% of metal salt of a fatty acid and 5–60% of polyol.

17. A stabilizer mixture according to claim 15, comprising 2–30% of tris-(2,4di-tert-butylphenyl) phosphite, 5–35% of calcium stearate or laurate, 5–35% of zinc stearate or laurate and 5–60% of pentaerythritol.

18. A plastic mixture predominantly comprising polyolefins and 0.05–20% by weight of PVDC, and furthermore comprising (a) at least one organic phosphite or phosphonite and (b) at least one metal salt of a fatty acid.

19. A plastic mixture according to claim 18, wherein the plastic mixture is a recyclate.

* * * * *